United States Patent Office 3,505,918
Patented Apr. 14, 1970

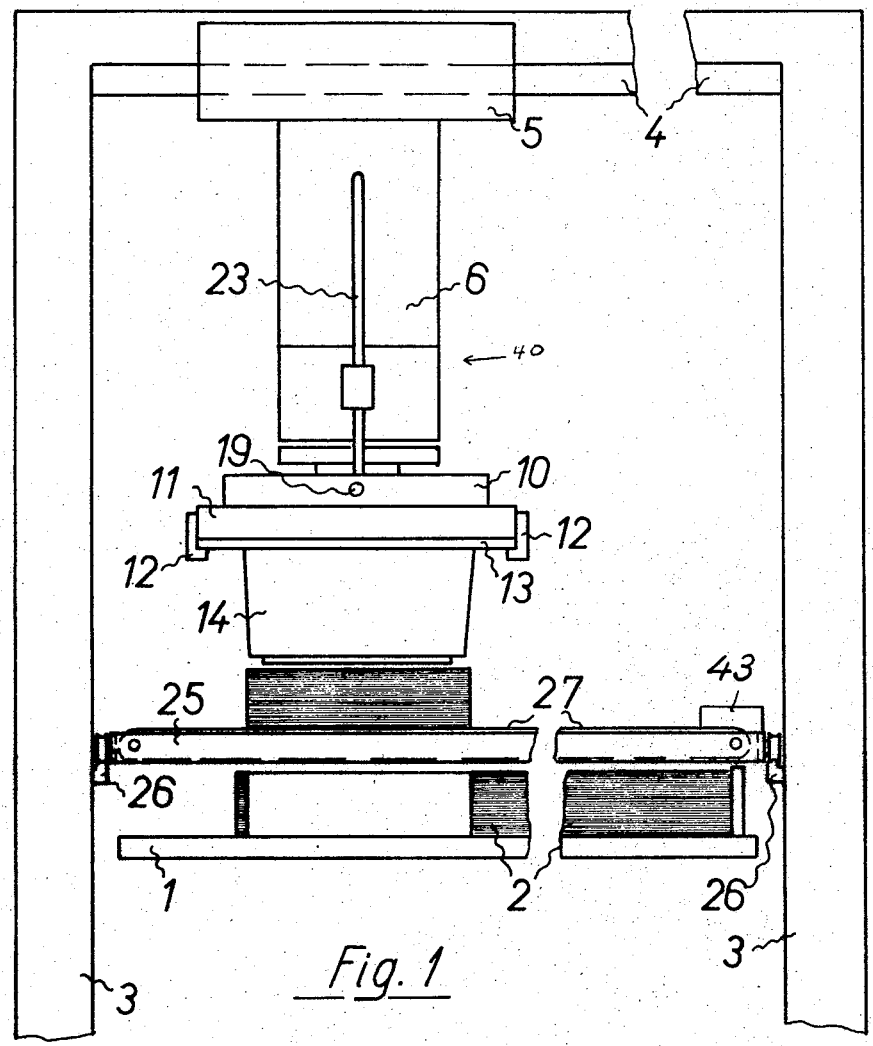
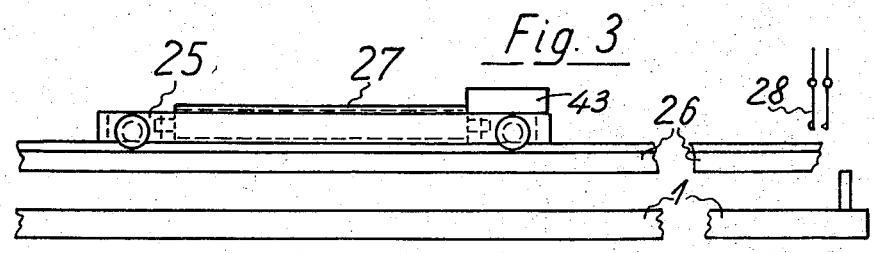

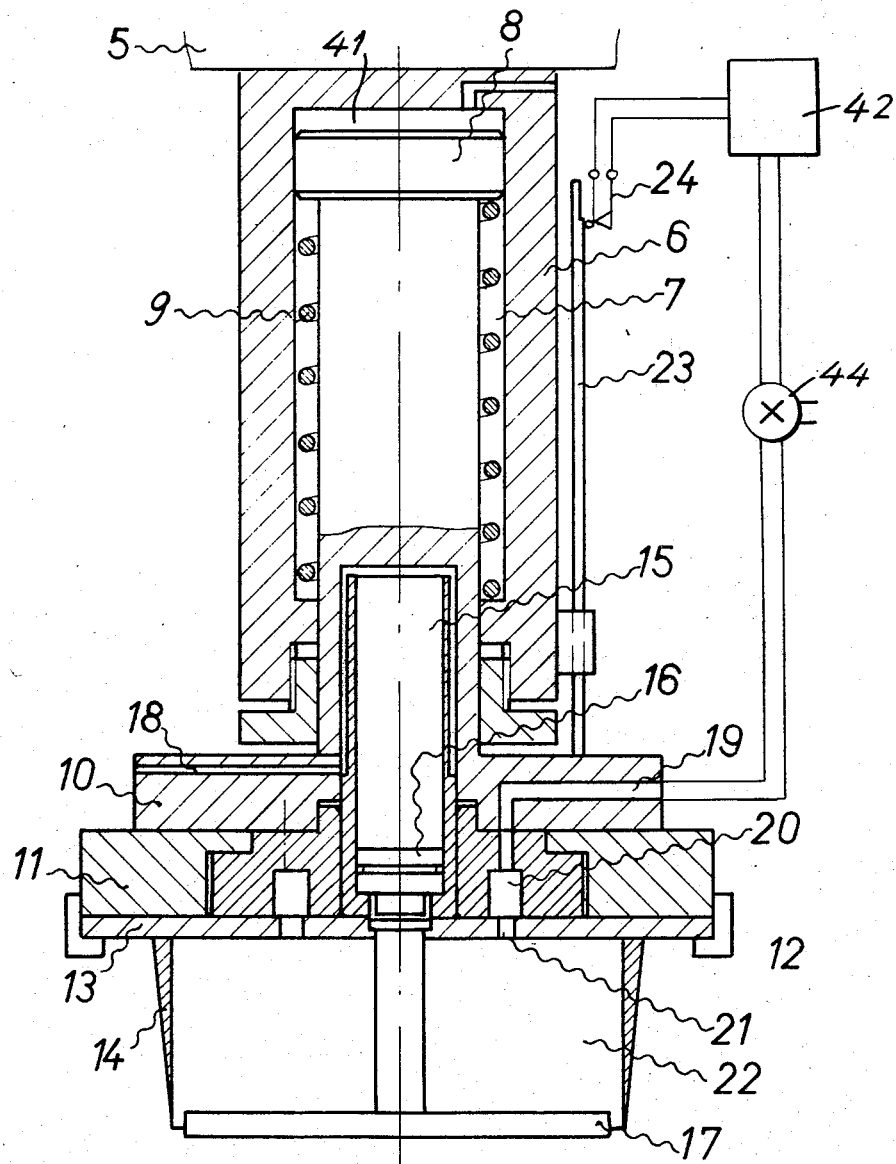

3,505,918
APPARATUS FOR DIE-CUTTING BLANKS FROM A PILE OF SHEET MATERIAL
Willy Schneider, 43 Albisstrasse,
8134 Adliswil, Switzerland
Filed June 19, 1967, Ser. No. 649,072
Claims priority, application Switzerland, June 21, 1966,
8,968/66
Int. Cl. B65h 35/00
U.S. Cl. 83—112               3 Claims

ABSTRACT OF THE DISCLOSURE

A method of cutting blanks from a pile of sheets by means of a frame-shaped closed cutting die. The die has a space which can be modified to create a partial vacuum therewithin. The blanks are cut from the pile by means of the die and the partial vacuum then broken, and the cut blanks discharged upon the delivery table. The invention also includes the cutting die itself which includes a cutter head having a space therewithin, an air conduct opening into the space, a valve within the conduit, a vacuum source connected to the conduit, and a shiftable delivery table beneath the die.

---

This invention relates to a method of die cutting blanks from a pile of sheet material. The sheet material used can be paper, plastic foil, metal foil and the like.

This invention also includes specialized apparatus for die cutting blanks from such a pile of sheet material.

Conventionally die cutting is performed by placing a pile of sheet material in juxtaposition with a cutting head of a die which then impinges upon the blanks and cuts them into proper shape.

Unfortunately, in the conventional method, the blanks may stick in the die head or in the pile itself between the cut portion and the surrounding portions of the pile. Therefore, conventionally, these blanks have to be loosened from their stuck position and removed.

In addition to this causing an additional operation to be performed, the material of the pile which surrounds the cutout blanks may move and shift, causing further difficulty with respect to other die cutting operations which may have to be performed.

These disadvantages are avoided in this invention by providing a frame-shaped closed cutting die. A partial vacuum is created inside the cutting die after the blanks are cut out by the cutting head so that the cutout blanks are kept within the cutting die. While the vacuum is engaged, a shiftable delivery table is moved under the die, the vacuum is then broken which causes the blanks to be discharge from the die onto the delivery table.

The apparatus, to perform the method of this invention, may be briefly described as comprising a movable cutting die having a head portion thereof which includes a vacuum chamber therewithin. An air conduit opens into such vacuum chamber and is connected to vacuum producing means. A valve intervenes the conduit between the space within the cutting head and the source of vacuum.

The above constitutes a brief description of this invention and some of the objects and advantages thereof. Other objects and advantages of this invention will become apparent as this description proceeds.

The invention will be further described by reference to the accompanying drawings which form a part of this specification.

FIGURE 1 is a front view of a die press including a cutting die made in accordance with this invention;

FIGURE 2 is an enlarged longitudinal sectional view through the ram of the die press which includes the cutting die of this invention; and FIGURE 3 is a side view of a portion of the die press including details of the apparatus utilized in accordance with this invention.

The invention will be further described by reference to the specific form thereof shown in the accompanying drawings which represent the best mode known to the inventor of carrying out his invention. In this connection, however, the reader is cautioned to note that the specific form of this invention as set forth in the drawings herein is for illustrative purposes and for purposes of example only. Various changes and modifications can obviously be made within the spirit and scope of this invention and would occur to those skilled in this art.

Now referring to the specific form of the invention as shown in the drawings for a specific description thereof, there is shown a die press which includes a table 1 which supports a pile 2 of sheet material which is to be die-cut in accordance with the method of the invention. A pair of uprights 3 carrying a transverse top member 4 is provided and is disposed along said table 1. Along top member 4 there is a shiftable slide 5 which carries a downwardly depending cylinder 6 having a bore 7. A piston 8 moves within cylinder 7 in a reciprocable manner. A coil spring 9 is depressed within bore 7 and biases piston 8 in its upward position.

A pressure fluid (not shown) is introduceable into space 41 above piston 8 and therefore can move piston 8 in a downward direction.

A plate 10 is provided at the lower end of piston 8 and a second plate 11 is carried by plate 10 but may be rotatably moved. Plate 11 includes a pair of opposite guides 12. Between guides 12 a die head holding plate 13 is mounted and a cutting die head 14 is secured thereto.

Within piston 8 there is an additional bore 15 provided in which a second piston 16 is movable. Piston 16 also includes a thrust plate 17 which is secured thereto. Plate 17 can be pressed against the upper side of pile 2 by a pressure fluid which is introduced by bore 18 in plate 10.

Plate 10 is also provided with an additional opening 19 which leads into an annular space 20 located within plate 11. Space 20 is connected to bore 21 which in turn leads into space 22 which is surrounded by cutting die head 14.

Plate 10 also carries a rod 23 which abuts a control switch 24 which can, in turn, control a source of vacuum 42 (such as an electrically driven vacuum pump) which, in turn, is connected to space 22.

Delivery table 25 is disposed above table 1 and is shiftable along guides 26 so that it can be moved in and out of operable relationship to a position under cutting die head 14.

An endless conveyor belt 27 is provided above delivery table 25 which is movable by appropriate driving means 43. A control switch 28 is provided which switches the driving means of the conveyor belt 27 on as soon as the delivery table 25 reaches its appropriate position.

With the foregoing specific description the apparatus of this invention, in operation, will now be explained.

Pile 2, which comprises the raw stock which is to be cut by the apparatus of this invention, is placed upon table 1 and adjusted to be impingeable with cutting die head 14 which is now disposed in spaced relationship thereabove. At this point pressure fluid is introduced into space 41 and space 15 which causes movement of pistons 8 and 16. This causes thrust plate 17 to bear against pile 2 and then to move cutting die head 14 downwardly to penetrate the pile and to cut out the blanks. In the meantime the vacuum pump 42 has been connected to space 22 by means of elements 21, 20 and 19. There is, of course, valve means 44 between space 22 and the vacuum pump.

At this point space 22 is open to atmosphere since the valve means are in open position and therefore space 22 does not contain a partial vacuum; however, shortly before the cutting step is finished, the valve is closed which connects the vacuum pump to space 22. At this point the vacuum within space 22 keeps the blanks within the cutting die head while the piston 8 returns to its upper position, since the pressure fluid within spaces 41 and 15 has now been drained off.

At this point delivery table 25 is moved under head 14 and the valve controlling the vacuum within space 22 opened so as to cause this space to be in atmospheric pressure. The blanks are then discharged upon the delivery table by downward movement of thrust plate 17 which is performed by means of pressure fluid acting on piston 16. The control switch 28 is then actuated which switches on the driving means of conveyor belt 27 which moves the blanks from its position underneath die head 14 to appropriate delivery position.

In order to move the cutting die to a different position upon the pile the slide 5 can be moved along the top member 4 or the table 1 can be shifted.

The foregoing sets forth the manner in which the objects of this invention are achieved.

What is claimed is:

1. An apparatus for cutting blanks from a pile of sheet materials, said apparatus comprising a table adapted to carry the pile to be cut, a transverse top member fixed above said table, a slide carried by and movable along said top member, a cylinder carried by said slide and extending downwardly toward said table, a piston located within said cylinder and movable therein in directions toward and away from said table, a cutting die head for cutting said pile, means connecting said die head with the bottom of said piston, and having a passage to the interior of said die head, means selectively creating a vacuum in said die interior through said passage, and a delivery table movable into the space below said die head.

2. An apparatus in accordance with claim 1, comprising a conveyor belt carried by said delivery table.

3. An apparatus in accordance with claim 2, comprising guides supporting said delivery table, driving means for said conveyor belt and a control switch connected with said driving means.

References Cited

UNITED STATES PATENTS

| | | | |
|---|---|---|---|
| 585,789 | 7/1897 | Rosback | 83—112 X |
| 761,842 | 6/1904 | Laukhuff | 83—112 |
| 2,366,728 | 1/1945 | Handley | 83—100 |
| 2,603,338 | 7/1952 | Fried | 83—155 X |
| 3,084,580 | 4/1963 | Schmid | 83—123 |
| 3,088,354 | 5/1963 | Voorhees | 83—152 X |
| 3,248,980 | 5/1966 | Downing | 83—100 X |
| 3,344,697 | 10/1967 | Schneider | 83—137 X |

FOREIGN PATENTS

| | | |
|---|---|---|
| 358,156 | 10/1931 | Great Britain. |
| 828,009 | 5/1938 | France. |

FRANK T. YOST, Primary Examiner

U.S. Cl. X.R.

83—123, 152, 155, 639